(12) United States Patent
Mundt et al.

(10) Patent No.: US 10,001,820 B2
(45) Date of Patent: *Jun. 19, 2018

(54) TELESCOPING ENCLOSURE FOR INFORMATION HANDLING SYSTEM COMPONENT

(71) Applicant: Dell Products L.P., Round Rock, TX (US)

(72) Inventors: Kevin Mundt, Austin, TX (US); Jason Adrian, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/171,750

(22) Filed: Jun. 2, 2016

(65) Prior Publication Data

US 2016/0274627 A1   Sep. 22, 2016

Related U.S. Application Data

(63) Continuation of application No. 13/715,862, filed on Dec. 14, 2012, now Pat. No. 9,383,786.

(51) Int. Cl.
*G06F 1/18* (2006.01)
*G06F 1/20* (2006.01)

(52) U.S. Cl.
CPC ............. *G06F 1/188* (2013.01); *G06F 1/181* (2013.01); *G06F 1/187* (2013.01); *G06F 1/20* (2013.01)

(58) Field of Classification Search
CPC .......... G06F 1/188; G06F 1/181; G06F 1/187; G06F 1/20; G06F 1/203
See application file for complete search history.

(56) References Cited

U.S. PATENT DOCUMENTS

| | | | |
|---|---|---|---|
| 5,010,426 A | 4/1991 | Krenz | 360/99.15 |
| 5,317,481 A | 5/1994 | Hillis et al. | 361/796 |
| 5,415,559 A | 5/1995 | Ichimura | 439/259 |
| 5,441,416 A | 8/1995 | Gajewski et al. | 439/32 |
| 5,684,673 A | 11/1997 | Shibasaki et al. | 361/679.42 |
| 5,721,669 A | 2/1998 | Becker et al. | 361/679.31 |
| 6,086,390 A * | 7/2000 | Haut | H01R 13/447 174/57 |
| 6,386,887 B2 | 5/2002 | Boiret et al. | 439/52 |
| 6,456,489 B1 | 9/2002 | Davis et al. | 361/679.58 |
| 6,526,841 B1 | 3/2003 | Wanek et al. | 73/865.6 |
| 6,816,388 B2 | 11/2004 | Junkins et al. | 361/801 |
| 6,884,952 B2 | 4/2005 | Mauroux et al. | 200/251 |
| 6,926,548 B2 | 8/2005 | Reasoner et al. | 439/310 |
| 7,265,968 B2 | 9/2007 | Champion et al. | 361/679.01 |
| 7,291,032 B1 | 11/2007 | Carver et al. | 439/310 |
| 7,364,452 B2 | 4/2008 | Carver et al. | 439/310 |
| 7,654,844 B1 * | 2/2010 | Wormsbecher | H01R 13/62938 361/727 |
| 7,685,613 B2 | 3/2010 | Permut et al. | 720/657 |

(Continued)

*Primary Examiner* — David M Sinclair
*Assistant Examiner* — Robert Brown
(74) *Attorney, Agent, or Firm* — Baker Botts L.L.P.

(57) ABSTRACT

A telescoping enclosure for information handling system components is disclosed. The telescoping information handling system component comprises a first enclosure and a second enclosure slidably coupled to the first enclosure. A service loop is configured to electrically couple a first sub-component located in the first enclosure to a second sub-component located in the second enclosure.

18 Claims, 3 Drawing Sheets

(56) References Cited

U.S. PATENT DOCUMENTS

| | | | |
|---|---|---|---|
| 7,742,292 B1 | 6/2010 | Chong, Jr. | 361/679.39 |
| 7,837,482 B2 | 11/2010 | Kinoshita et al. | 439/131 |
| 8,172,594 B2 | 5/2012 | Brusaca et al. | 439/267 |
| 8,355,261 B2 | 1/2013 | Gordon | 361/759 |
| 8,804,351 B2 | 8/2014 | Tsai et al. | 361/752 |
| 8,908,388 B2 | 12/2014 | Chen | 361/802 |
| 9,383,786 B2 * | 7/2016 | Mundt | G06F 1/188 |
| 2002/0030966 A1 * | 3/2002 | Huggins | G06F 1/16 |
| | | | 361/679.58 |
| 2006/0067063 A1 | 3/2006 | Stahl et al. | 361/754 |
| 2008/0266779 A1 * | 10/2008 | Thomas | G06F 1/187 |
| | | | 361/679.34 |
| 2010/0140195 A1 * | 6/2010 | Henderson | H05K 7/1489 |
| | | | 211/13.1 |
| 2010/0200523 A1 * | 8/2010 | Henderson | H05K 7/1489 |
| | | | 211/26 |
| 2012/0200989 A1 * | 8/2012 | Byrne | H01R 13/447 |
| | | | 361/641 |
| 2013/0106265 A1 * | 5/2013 | Shelnutt | H05K 7/20254 |
| | | | 312/236 |

\* cited by examiner

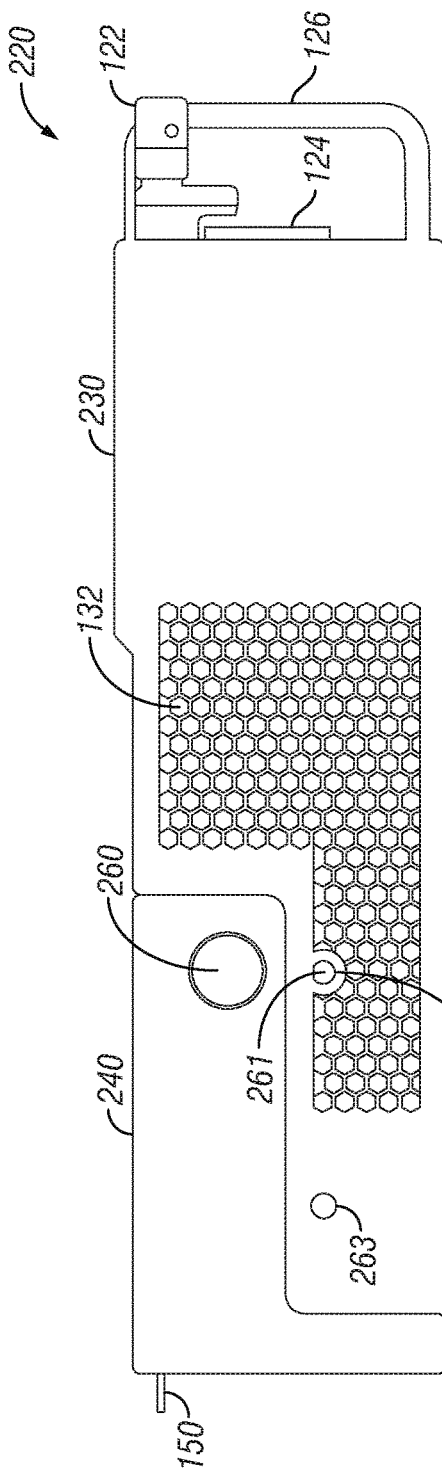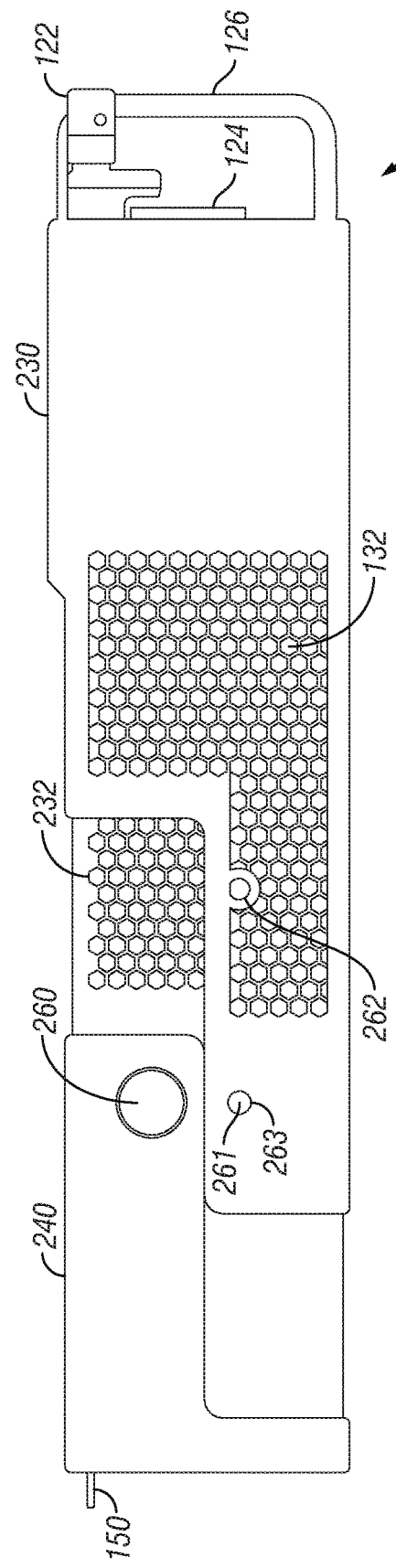

TELESCOPING ENCLOSURE FOR INFORMATION HANDLING SYSTEM COMPONENT

CROSS-REFERENCE TO RELATED APPLICATION

The present application is a continuation application of U.S. patent application Ser. No. 13/715,862 filed Dec. 14, 2012, the contents of which are hereby incorporated by reference in its entirety for all purposes.

TECHNICAL FIELD

The present disclosure relates generally to information handling systems, and more particularly to a telescoping enclosure for information handling system components.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, such as rack computer servers or rack computer storage, for example, may be configured in any number of shapes and/or sizes depending in part on the needs of the system. Some rack computer storage applications may employ a "just a bunch of drives" ("JBOD") architecture or storage arrays that include hard drives and processing engines. As with other types of information handling systems, information handling systems using JBOD style enclosures may be configured in different physical form factors. For example, storage enclosures may be configured in a short form factor for some basic applications (e.g., JBODs) or with a long form factor for storage array applications that require more processing power. Various information handling systems, including those for JBOD applications for example, may include peripheral components, such as power supplies. Such peripheral components may be electrically configured to operate with or in multiple information handling systems. However, peripheral components in rack-type applications, for example, may also need to be physically configured to correspond with the form factor of the particular information handing system in which or with which it operates.

SUMMARY

In accordance with teachings of the present disclosure, disadvantages and problems associated with enclosures for information handling system components have been substantially reduced or eliminated. In one embodiment of the present disclosure, a telescoping information handling system component is disclosed. The telescoping information handling system component comprises a first enclosure, a second enclosure slidably coupled to the first enclosure, and a service loop configured to electrically couple a first sub-component located in the first enclosure to a second sub-component located in the second enclosure.

In another embodiment of the present disclosure, an information handling system is disclosed. The information handling system comprises a bay and a telescoping information handling system component electrically coupled to the bay. The telescoping information handling system component may include a first enclosure, a second enclosure slidably coupled to the first enclosure, and a service loop configured to electrically couple a first sub-component located in the first enclosure to a second sub-component located in the second enclosure.

In another embodiment of the present disclosure, a telescoping power supply is disclosed. The telescoping power supply comprises a first enclosure, a second enclosure slidably coupled to the first enclosure, a converter located in at least one of the first enclosure and the second enclosure, and a service loop extending from the first enclosure to the second enclosure.

BRIEF DESCRIPTION OF THE DRAWINGS

A more complete understanding of the disclosed embodiments and advantages thereof may be acquired by referring to the following description taken in conjunction with the accompanying drawings, in which like reference numbers indicate like features, and wherein:

FIG. 2 illustrates a telescoping power supply set to a shortened length, in accordance with some embodiments of the present disclosure;

FIG. 3 illustrates a telescoping power supply set to an elongated length, in accordance with some embodiments of the present disclosure;

DETAILED DESCRIPTION

Preferred embodiments and their advantages are best understood by reference to FIGS. 1-5, wherein like numbers are used to indicate like and corresponding parts.

For the purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
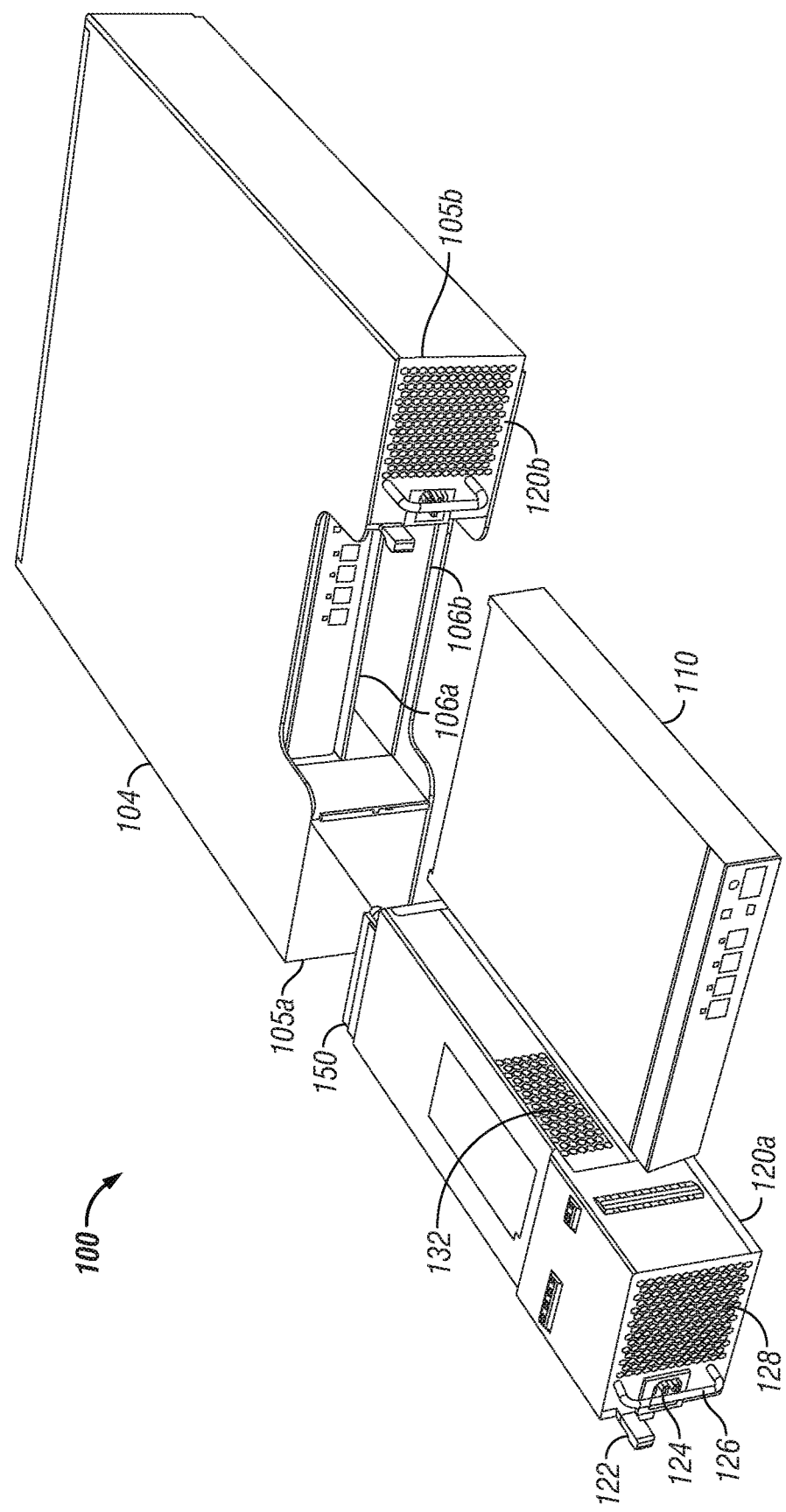
FIG. 1 illustrates an information handling system, in accordance with some embodiments of the present disclosure.

FIG. 1 illustrates an information handling system 100, in accordance with some embodiments of the present disclosure. Information handling system 100 may include, for example, bay 104, memory drive 110, and power supply 120.

Bay 104 may be configured to be placed within a rack or a chassis with one or more other bays 104. Moreover, bay 104 may be configured such that various components of information handling system 100 may be placed within bay 104. For example, in some embodiments, bay 104 may be configured such that one or more power supplies 120 may be placed into bay 104. For example, power supply 120a may be placed into bay opening 105a, and power supply 120b may be placed into bay opening 105b. One way of placing components into bay 104 may be sliding them into the respective bay openings. Bay 104 may include other openings, such as bay opening 106a and bay opening 106b, that may be configured to receive other components of information handling system 100. In some embodiments, for example, bay opening 106a and bay opening 106b may be configured to receive instantiations of memory drive 110.

Power supply 120 may include latch 122, electrical input 124, handle 126, front vents 128, side vents 132, and backplane connector 150. In some embodiments, latch 122 may be configured to automatically latch power supply 120 into place when power supply 120 is placed into bay 104 and to release power supply 120 from its place within bay 104 when latch 122 is pressed. Handle 126 may be gripped by a user in order to place power supply 120 into or out of bay 104.

Front vents 128 may be configured to allow air to flow in or out of power supply 120. Similarly, side vents 132 may be configured to allow air to flow in or out of power supply 120. As described in further detail below with reference to FIGS. 4 and 5, power supply 120 may include one or more internal fans (not expressly shown in FIG. 1). In some embodiments, an internal fan may be configured to dissipate heat generated within power supply 120. For example, in some embodiments, an internal fan may be configured to pull cool air in through front vents 128 and to push hot air out through side vents 132. In other embodiments, an internal fan may be configured to pull cool air in through side vents 132 and to push hot air out through front vents 128.

Power supply 120 may include backplane connector 150. When power supply 120 is placed in bay 104, backplane connector 150 may connect to a backplane (not expressly shown) within bay 104 that may electrically couple one or more components within bay 104 to each other. For example, power supply 120 may provide power to other components that may be inserted within bay 104 via the backplane. Likewise, components within bay 104 may send or receive other electrical communication signals to or from other components within bay 104 via the backplane.

Although FIG. 1 illustrates an embodiment of bay 104 with a particular form factor and a particular depth, various embodiments of bay 104 may include various form factors and various depths. For example, in some embodiments, the openings in bay 104 may be relatively deep from front to back compared to other embodiments, and in some embodiments, the openings in bay 104 may be relatively shallow from front to back compared to other embodiments.

In some embodiments, bay 104 may have openings on opposing sides of bay 104 configured to receive components of information handling system 100. For example, in some embodiments, components such as power supply 120 may be placed into openings on one side of bay 104, and components such as memory drive 110 may be placed into openings on an opposing side of bay 104. In such embodiments, bay 104 may have an internal backplane in the middle of bay 104 to which components that are placed on opposing sides of bay 104 may each connect.

FIG. 2 and FIG. 3 illustrate telescoping power supply 220, in accordance with some embodiments of the present disclosure. As shown in FIG. 2 and FIG. 3, telescoping power supply 220 may have an adjustable length, and accordingly, may be compatible with different embodiments of bay 104 having different depths. Though various embodiments described within this disclosure include telescoping power supply 220, which may have an adjustable length, telescoping power supply 220 is just one example of a component within information handling system 100 that may have an adjustable length in accordance with the teachings of the present disclosure. Other examples of information handling system components that may utilize telescoping enclosures with an adjustable length may include, but are not limited to, stand-alone fan modules, control panels, system management modules, and/or expander modules to address additional hard drives.

The use of telescoping information handling system components such as telescoping power supply 220 provides several cost advantages as compared to the use of a unique component for each different form factor required by different applications. For example, the research and development costs of one telescoping power supply 220 may be less than the research and development costs of multiple power supplies with different lengths. Further, acquiring regulatory approval to sell one telescoping power supply 220 may be less costly that acquiring regulatory approval to sell multiple power supplies with different lengths. Moreover, using a smaller amount of components that are compatible with multiple products rather than a larger amount of product-unique components may allow a company to ship higher volumes of fewer unique components, and thus simplify supply chain management and reduce supply chain costs.

FIG. 2 illustrates telescoping power supply 220 set to a shortened length, in accordance with some embodiments of the present disclosure. Telescoping power supply 220 may include front enclosure 230, back enclosure 240, latching button 260, latching pin 261, latching hole 262, and latching hole 263. Front enclosure 230 may be slidably coupled to back enclosure 240. In some embodiments, latching button 260 may be pressed to allow the position of front enclosure 230 relative to back enclosure 240 to be slidably adjusted. For example, latching button 260 may be spring loaded and internally coupled to latching pin 261. Upon pressing latching button 260, latching pin 261 may be released from latching hole 262, and thus may allow the relative positions of front enclosure 230 and back enclosure 240 to be adjusted. For example, front enclosure 230 and back enclosure 240 may be slidably adjusted to the positions illustrated in FIG. 3.

FIG. 3 illustrates telescoping power supply 220 set to an elongated length. As shown in FIG. 3, the relative positions of front enclosure 230 and back enclosure 240 may be adjusted until latching pin 261 coincides with latching hole 263, at which point telescoping power supply 220 may be latched into an elongated configuration. In some embodiments, a portion of either back enclosure 240 or front enclosure 230 may be manufactured so that the portion may be nested within the other enclosure. For example, a portion of back enclosure 240 may be manufactured such that the portion may be nested within the overlapping portion of front enclosure 230 when telescoping power supply 220 is set to a shortened length.

Back enclosure 240 may further include nested side vents 232. When telescoping power supply 220 is set to a shortened length as shown in FIG. 2, nested side vents 232 may align with side vents 132 that may be formed in front enclosure 230. When telescoping power supply 220 is set to an elongated setting as shown in FIG. 3, nested side vents 232 may extend outside of front enclosure 230, and thus may provide further venting area for telescoping power supply 220. Although FIG. 2 and FIG. 3 illustrate an embodiment of telescoping power supply 220 with nested side vents 232 that align with side vents 132, the portions of front enclosure 230 and back enclosure 240 that may overlap at various settings may be configured in any combination of vented, partially vented, or unvented sub-portions. When a vented portion overlaps with an unvented portion, the unvented portion may be referred to as obstructing the vented portion. For example, in some embodiments, nested side vents 232 may be obstructed by an unvented portion of front enclosure 230 when telescoping power supply 220 is set to a shortened length, and may be unobstructed when telescoping power supply 220 is set to an elongated length. Similarly, in some embodiments, side vents 132 may be obstructed by an unvented portion of back enclosure 240 when telescoping power supply 220 is set to a shortened length, and may be unobstructed when telescoping power supply 220 is set to an elongated length. Accordingly, telescoping power supply 220 may be configured to have a venting profile that remains constant across multiple potential settings, or may be configured to have a venting profile that varies across multiple potential settings.

Although FIG. 2 and FIG. 3 illustrate telescoping power supply 220 with latching button 260, latching pin 261, and latching holes 262 and 263, any suitable means of latching and/or setting the length of telescoping power supply 220 may be employed. Moreover, telescoping power supply 220 may be configured such that it can be set to any suitable number of lengths. For example, in some embodiments, telescoping power supply 220 may be configured to be set to two potential lengths. In other embodiments, telescoping power supply 220 may be configured to be set to three or more potential lengths. For example, telescoping power supply 220 may be configured to be set to an elongated length, a shortened length, or an intermediate length half way between the elongated length and the shortened length.

Moreover, in some embodiments, telescoping power supply 220 may be configured to automatically adjust to the depth of bay 104 as it is inserted into bay 104. For example, in embodiments of bay 104 compatible with a shortened telescoping power supply 220, bay 104 may include a triggering mechanism (not expressly shown) that may correspond to latching button 260. In such an example, telescoping power supply 220 may initially be set to an elongated setting. When telescoping power supply 220 is placed inside of bay 104, the triggering mechanism inside of bay 104 may align with and press latching button 260. With latching button 260 pressed, telescoping power supply 220 may automatically be adjusted to a shortened length as it is being placed inside of bay 104. In embodiments of bay 104 compatible with an elongated telescoping power supply 220, the triggering mechanism may be omitted such that telescoping power supply 220 may maintain an elongated length as it is being placed into bay 104. Though one potential mechanism is described for automatically setting the length of telescoping power supply 220, any suitable mechanical, electrical, or other mechanism may be employed to automatically set the length of telescoping power supply 220 before, during, or after the insertion of telescoping power supply into bay 104.

Figure 4:
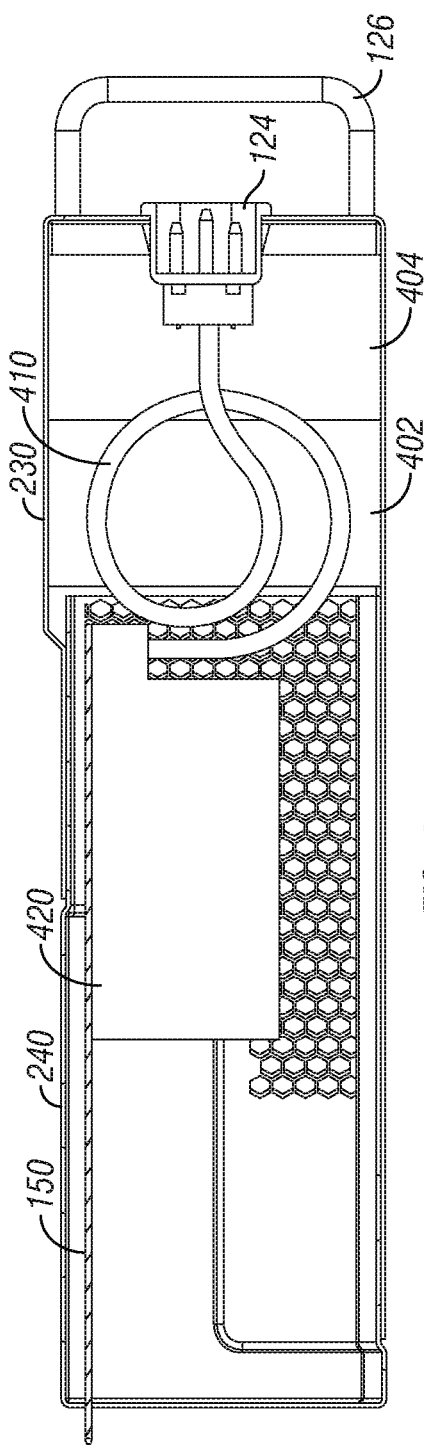
FIG. 4 illustrates a side cross-section view of a telescoping power supply, in accordance with some embodiments of the present disclosure.

FIG. 4 illustrates a side cross-section view of telescoping power supply 220, in accordance with some embodiments of the present disclosure. As shown in FIG. 4, the inside of telescoping power supply 220 may include fan 402, fan 404, service loop 410, and power converter 420. For the purposes of the present disclosure, telescoping power supply 220 is one example of a telescoping component of information handling system 100. Moreover, devices and/or components within telescoping power supply 220 or other telescoping components of information handling system 100 may be referred to "components" or "sub-components."

In some embodiments, fan 402 and fan 404 may be located in front enclosure 230. Similar to the description above with reference to FIG. 1, in some embodiments, fan 402 and fan 404 may be configured to pull cool air in through front vents 128 (illustrated in FIG. 1) and to push hot air out through side vents 132 and nested side vents 232 (illustrated in FIG. 2 and FIG. 3). Likewise, in some embodiments, fan 402 and fan 404 may be configured to pull cool air in through side vents 132 and nested side vents 232 and to push hot air out through front vents 128. For the purposes of the present disclosure, front vents 128, side vents 132, and nested side vents 232 may be referred to as inlet vents when they are configured to allow fan 402 and/or fan 404 to pull air inside telescoping power supply 220 in one or more of the multiple potential length settings. Likewise, front vents 128, side vents 132, and nested side vents 232 may be referred to as outlet vents when they are configured to allow fan 402 and/or fan 404 to push air outside of telescoping power supply 220 in one or more of the multiple potential length settings.

In some embodiments, power converter 420 may be located in back enclosure 240. Power converter 420 may receive electrical power from electrical input 124 via service loop 410, and convert it into a form that is usable by information handling system 100. For example, power converter 420 may be configured to receive a 120 volt alternating-current ("AC") supply voltage and convert it to a direct-current ("DC") supply voltage at any suitable voltage level for use by information handling system 100. For such embodiments, power converter 420 may be referred to as an AC-to-DC converter. Likewise, power converter 420 may be configured to receive a higher-voltage DC supply voltage and covert it to any suitable lower-voltage DC supply voltage that may be used by information handling system 100. For such embodiments, power converter 420 may be referred to as a DC-to-DC converter. Power converter 420 may be configured to convert any suitable amount of power required by information handling system 100. In some embodiments, power converter 420 may be configured to supply, for example, 1080 watts of power. In such embodiments, telescoping power supply 220 may be referred to as a 1080-watt power supply. Power converter 420 may be electrically coupled to backplane connector 150, and may thus supply a converted voltage supply to other components within information handling system 100 via bay 104's backplane. Because power converter 420 may supply a converted voltage to other components within information handling system 100, it may be referred to as a power supply. Likewise, telescoping power supply 220, which may include power converter 420, may also be referred to as a power supply. Though FIG. 4 illustrates an embodiment with power converter 420 located in back enclosure 240, in some embodiments, power converter 420 may be located in front enclosure 230 and may be coupled to back plane connector 150 through service loop 410. Likewise, any sub-component in a telescoping information handling system component such as telescoping power supply 220 may be located in any suitable position within either front enclosure 230 or back enclosure 240.

Service loop 410 may be configured to maintain an electrical coupling between electrical input 124 and power converter 420 at any potential length setting for telescoping power supply 220. In some embodiments, service loop 410 may be placed to the side of fan 402 and fan 404 in order to not interfere with the fan blades. Moreover, in some embodiments, service loop 410 may be coiled in order to adapt to an adjustable distance between electrical input 124, which may be located in front enclosure 230, and power converter 420, which may be located in back enclosure 240. As shown in FIG. 4, when telescoping power supply 220 is set to a shortened setting, service loop may coil in a manner that adapts to a shortened distance between electrical input 124 and power converter 420.

Figure 5:
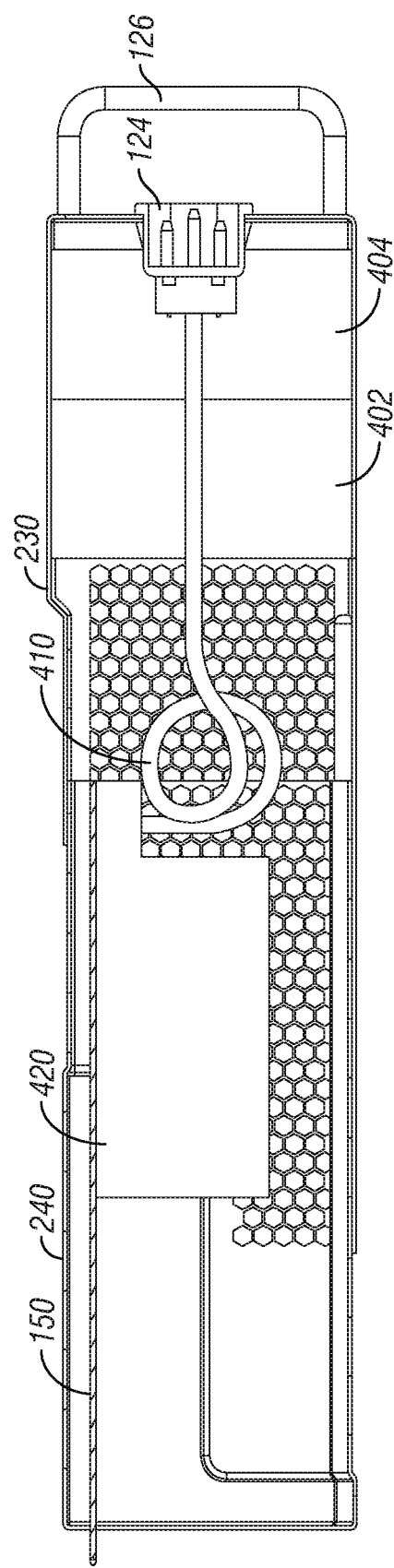
FIG. 5 illustrates a side cross-section view of a telescoping power supply, in accordance with some embodiments of the present disclosure.

FIG. 5 illustrates a side cross-section view of a telescoping power supply, in accordance with some embodiments of the present disclosure. As shown in FIG. 5, when telescoping power supply 220 is set to an elongated length, service loop 410 may have a coil that may provide extra length and thereby may adapt to an elongated distance between electrical input 124 and power converter 420.

Though service loop 410 is shown in FIG. 4 and FIG. 5 as electrically coupling power converter 420 to electrical input 124, service loop 410 may include multiple electrical couplings, and may provide for electrical coupling of any sub-component configured within back enclosure 240 to any sub-component configured within front enclosure 230. For example, service loop 410 may be configured to transmit an indicator signal from power converter 420, backplane connector 150, or any other sub-component within back enclosure 240, to an indicator light that may be configured on the front of front enclosure 230. Likewise, service loop may be configured to transmit, for example, control signals from backplane connector 150 to fan 402 and fan 404.

In some embodiments, a sub-component may include multiple elements that may be divided between front enclosure 230 and back enclosure 240. For example, in some embodiments, power converter 420 may include elements such as transformers, power transistors, a diodes, and/or capacitors (not expressly shown). In such embodiments, power converter 420 may include, for example, a transformer (not expressly shown) that may be located in front enclosure 230 and one or more capacitive elements (not expressly shown) that may be located in back enclosure 240. Moreover, in such embodiments, the elements located in front enclosure 230 may be coupled to the elements located in back enclosure 240 through service loop 410.

Although the present disclosure has been described in detail, it should be understood that various changes, substitutions, and alterations can be made hereto without departing from the spirit and the scope of the disclosure as defined by the appended claims.

What is claimed is:

1. A telescoping information handling system component, comprising:
   a first enclosure;
   a second enclosure slidably coupled to the first enclosure along a sliding path;
   a latch coupled to the first enclosure and adapted to latch the first enclosure into one of a plurality of available selectably latchable positions relative to the second enclosure on the sliding path; and
   a service loop configured to electrically couple a first sub-component located in the first enclosure to a second sub-component located in the second enclosure, wherein the second sub-component is a memory drive or a hard drive.

2. The telescoping information handling system component of claim 1, further comprising an internal fan to pull cool air through an inlet vent and to push hot air out through an outlet vent, the inlet vent and the outlet vent at least partially unobstructed in each of the selectably latchable positions.

3. The telescoping information handling system component of claim 1, further comprising a power converter coupled to the first enclosure, the power converter to:
   receive alternating current electrical power from an electrical input via the service loop; and
   convert the alternating current electrical power into direct current electrical power.

4. The telescoping information handling system component of claim 1, wherein the service loop is further configured to electrically couple the first sub-component located in the first enclosure to a third sub-component located in the second enclosure.

5. The telescoping information handling system component of claim 1, wherein the latch includes a latching button adapted to release the latch.

6. The telescoping information handling system component of claim 5, wherein the latching button is spring-loaded.

7. An information handling system comprising:
   a bay; and
   a telescoping information handling system component slidably coupled to the bay and electrically coupled to the bay, the telescoping information handling system component including:
   a first enclosure;

a second enclosure slidably coupled to the first enclosure along a sliding path;
a latch coupled to the first enclosure and adapted to latch the first enclosure into one of a plurality of available selectably latchable positions relative to the second enclosure on the sliding path; and
a service loop configured to electrically couple a first sub-component located in the first enclosure to a second sub-component located in the second enclosure, wherein the second sub-component is a memory drive or a hard drive.

8. The information handling system of claim 7, the telescoping information handling system component further comprising an internal fan to pull cool air through an inlet vent and to push hot air out through an outlet vent, the inlet vent and the outlet vent at least partially unobstructed in each of the selectably latchable positions.

9. The information handling system of claim 7, wherein the telescoping information handling system component further comprises a power converter coupled to the first enclosure, the power converter to:
receive alternating current electrical power from an electrical input via the service loop; and
convert the alternating current electrical power into direct current electrical power.

10. The information handling system of claim 7, wherein the service loop is further configured to electrically couple the first sub-component located in the first enclosure to a third sub-component located in the second enclosure.

11. The information handling system of claim 7, wherein the latch includes a latching button adapted to release the latch.

12. The information handling system of claim 11, wherein the latching button is spring-loaded.

13. A telescoping power supply, comprising:
a first enclosure;
a second enclosure slidably coupled to the first enclosure along a sliding path;
a latch coupled to the first enclosure and adapted to latch the first enclosure into one of a plurality of available selectably latchable positions relative to the second enclosure on the sliding path; and
a converter located in at least one of the first enclosure and the second enclosure; and
a service loop configured to electrically couple a first sub-component located in the first enclosure to a second sub-component located in the second enclosure, wherein the second sub-component is a memory drive or a hard drive.

14. The telescoping power supply of claim 13, further comprising an internal fan to pull cool air through an inlet vent and to push hot air out through an outlet vent, the inlet vent and the outlet vent at least partially unobstructed in each of the selectably latchable positions.

15. The telescoping power supply of claim 13, the converter to:
receive alternating current electrical power from an electrical input via the service loop; and
convert the alternating current electrical power into direct current electrical power.

16. The telescoping power supply of claim 13, the converter to:
receive direct current electrical power at a first voltage from an electrical input via the service loop; and
convert the direct current electrical power at the first voltage into direct current electrical power at a second voltage, the second voltage lower than the first voltage.

17. The telescoping power supply of claim 13, wherein the latch includes a latching button adapted to release the latch.

18. The telescoping power supply of claim 17, wherein the latching button is spring-loaded.

* * * * *